(12) United States Patent
Day

(10) Patent No.: US 7,963,503 B2
(45) Date of Patent: Jun. 21, 2011

(54) METAL SEAL WITH FLEXIBLE INSERT

(75) Inventor: Paul A. Day, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 192 days.

(21) Appl. No.: 11/534,010

(22) Filed: Sep. 21, 2006

(65) Prior Publication Data
US 2008/0073612 A1  Mar. 27, 2008

(51) Int. Cl.
*F16K 5/00* (2006.01)
(52) U.S. Cl. .......................... 251/317; 251/305
(58) Field of Classification Search .................. 251/305, 251/306, 307, 308, 317
See application file for complete search history.

(56) References Cited

U.S. PATENT DOCUMENTS

| | | | |
|---|---|---|---|
| 4,005,848 A | 2/1977 | Eggleston | |
| 4,231,546 A | 11/1980 | Eggleston et al. | |
| 4,306,706 A * | 12/1981 | Olansen et al. | 251/306 |
| 4,341,233 A * | 7/1982 | Broadway | 137/72 |
| 4,418,889 A * | 12/1983 | Krause | 251/306 |
| 4,477,057 A | 10/1984 | Friess | |
| 4,623,121 A * | 11/1986 | Donnelly | 251/306 |
| 4,772,448 A * | 9/1988 | Popalis et al. | 376/463 |
| 5,419,532 A * | 5/1995 | Fan | 251/315.08 |
| 5,535,986 A * | 7/1996 | Hutchens et al. | 251/306 |
| 5,979,872 A * | 11/1999 | Stearns et al. | 251/305 |

FOREIGN PATENT DOCUMENTS

| | | |
|---|---|---|
| EP | 0 054 473 | 6/1982 |
| EP | 0 292 346 | 11/1988 |
| FR | 2 300 944 | 9/1976 |
| WO | WO-2005/114012 | 12/2005 |

OTHER PUBLICATIONS

International Search Report for PCT/US2007/078536, dated Jan. 2, 2008.
Product Bulletin, "Type 8532 High-Performance Butterfly Valve," 51.6:8532, Fisher, 16 pages (Nov. 2005).
Instruction Manual, "Type 8560 Eccentric Disc Butterfly Control Valve," Form 5343, Fisher, 32 pages (Feb. 2007).
Product Bulletin, "Rotary Control Valve Selection Guide," 40:002, Fisher, 14 pages (Dec. 2002).
Vanessa, "Series 30,000 Rotary Process Valve," Tyco, Flow Control, 20 pages.

* cited by examiner

*Primary Examiner* — John K Fristoe, Jr.
(74) *Attorney, Agent, or Firm* — Marshall, Gerstein & Borun LLP

(57) ABSTRACT

A rotary valve includes a valve body with an inlet, an outlet, a flow passage extending between the inlet and the outlet, and a rotating control element disposed within the valve body for selectively opening and closing the flow passage. The valve also includes a retainer ring mountable to the valve body which holds in place a seal carrier ring having an annular mounting flange mounted between the valve body and the retainer ring. The seal carrier ring also includes a seal carrier cartridge and a flexible portion coupling the seal carrier cartridge to the mounting flange to provide an improved seal and greater ease of assembly.

34 Claims, 4 Drawing Sheets

METAL SEAL WITH FLEXIBLE INSERT

FIELD OF THE INVENTION

The present invention relates generally to control valves, such as butterfly valves, having a pivotable valve closure member. More specifically, the present invention relates to a flexible seal insert for use on such valves, including butterfly valves.

BACKGROUND OF THE INVENTION

Control valves for controlling the flow of high pressure fluids and/or gases in a process system are generally well known in the art. In many applications, such control valves include a rotating valve disk movably disposed within the flow path extending through the valve body. One example of such a valve is commonly called a butterfly valve.

As is known, control valves typically have one or more seals to prevent leakage. Typically, such seals are placed advantageously between the control element and the valve body. Due to temperature fluctuations, vibration, and/or other environmental considerations, adequate sealing of the various valve components may present certain challenges. Butterfly valves typically have an O-ring that surrounds the valve disk and engages the surrounding valve body when the valve is closed. The O-ring in a butterfly valve is subject to the environmental considerations discussed above.

Accordingly, novel features in the construction and/or assembly of control valves and their associated components may be desired.

SUMMARY

In one disclosed example, a rotary valve includes a body having an inlet, an outlet, and a flow passage extending between the inlet and the outlet. A rotating control element is disposed within the valve body for selectively opening and closing the flow passage. A retainer ring, mountable to the valve body, holds in place a seal carrier ring having an annular mounting flange mounted between the valve body and the retainer ring. The seal carrier ring further includes a seal carrier cartridge and a flexible portion coupling the seal carrier cartridge to the mounting flange.

In further accordance with a preferred embodiment, the mounting flange and flexible portion are integrally formed of a single piece of material. The retainer ring and the valve body cooperate to define an annular groove sized to receive at least part of the flexible portion, and the flexible portion is disposed within the groove. The seal carrier cartridge may be coupled to the flexible portion by a laser weld, and may include a resilient seal insert, formed of PTFE, reinforced PTFE, graphite, reinformed graphite, UHMWPE, or KEL-F. The seal is sized for sealing engagement with the sealing surface of the rotating control element and disposed in a carrier channel. The resilient seal insert may be secured within the U-shaped carrier channel by a crimped sidewall or by a retaining flange on the channel, or by an adhesive, or by some combination of those structures. The flexible portion may have a U-shaped or V-shaped cross-section creating a resilient geometry, and may be formed of strain-hardened 316 stainless steel or Inconel 718, or other suitable materials.

In a second disclosed example, a seal for use in a butterfly valve having a valve body and a retainer ring includes a seal carrier ring having an annular mounting flange sized to extend between the valve body and the retainer ring. A seal carrier cartridge is coupled to the mounting flange by a flexible portion.

In a third disclosed example, a flexible seal carrier for use in a butterfly valve including a valve body, a retainer ring, and a valve disk having a sealing surface further includes a radially outward extending mounting portion sized to extend between the valve body and the retainer ring. The seal carrier includes a sealing member sized to surround the sealing surface of the valve disk to form a sealing engagement. A shaped cross-section between the mounting portion and the sealing member is arranged to permit the sealing member to shift relative to an axis perpendicular to the sealing surface of the valve disk and an axis parallel to the sealing surface of the valve disk.

DETAILED DESCRIPTION OF THE PREFERRED EMBODIMENTS

The embodiments described herein are not intended to be exhaustive or to limit the scope of the invention to the precise form or forms disclosed. Instead, the following embodiments have been described in order to best explain the principles of the invention and to enable others skilled in the art to follow its teachings.

Figure 1:
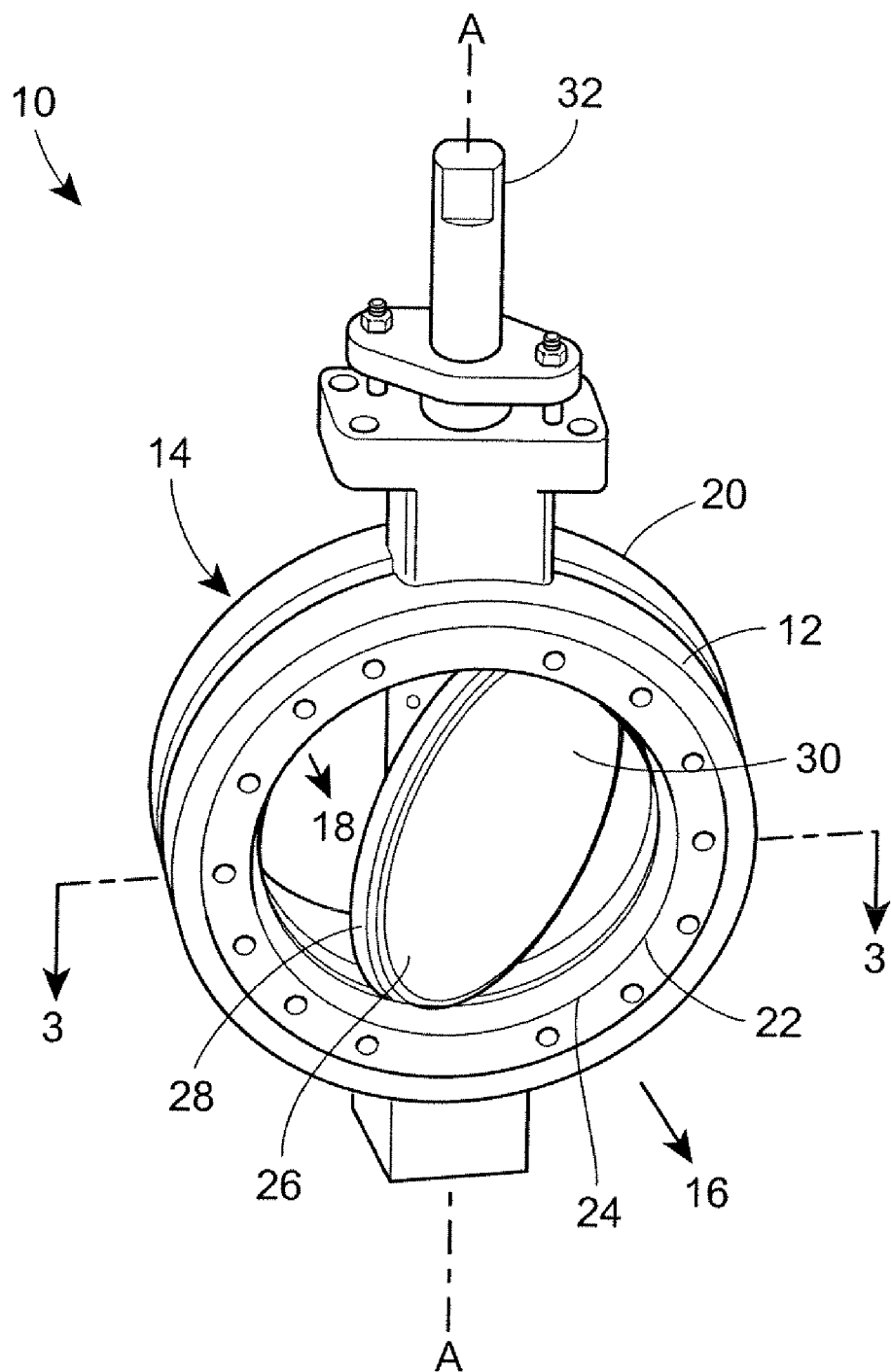
FIG. 1 is a perspective view of an assembled rotary-type or butterfly valve assembled in accordance with the teachings of the present invention and employing a metal seal with a flexible insert.

Referring to FIG. 1 of the drawings, a rotary valve assembled in accordance with the teachings of the present invention is shown and is referred to by the reference numeral 10. The rotary valve 10 includes a valve body 12 having an inlet 14 and an outlet 16. A flow passage 18 having an inlet end 20 and an outlet end 22 extends through the valve body 12 and is generally surrounded by an inner circumference 24 of the valve body 12. A rotating control element 26, having a generally circular face 30, is disposed within the valve body 12 for selectively opening and closing the flow passage 18. The rotating control element 26 is generally disk-like in shape and has a sealing surface 28. The rotating control element 26 is disposed within the valve body 12 such that, when closed, the generally circular face 30 of the rotating control element 26 substantially or completely blocks the flow passage 18, and the sealing surface 28 abuts the outer surface of the flow passage 18 (i.e., the inner circumference 24). The rotating control element 26 has an axis of rotation A which, in the disclosed example, extends transverse to the flow passage 18. An actuating member 32 passes through the valve body 12 to the rotating control element 26 along the axis of rotation A to effectuate the movement of the rotating control element 26. The actuating member 32 typically is operatively coupled to a valve actuator, as would be known.

Figure 2:
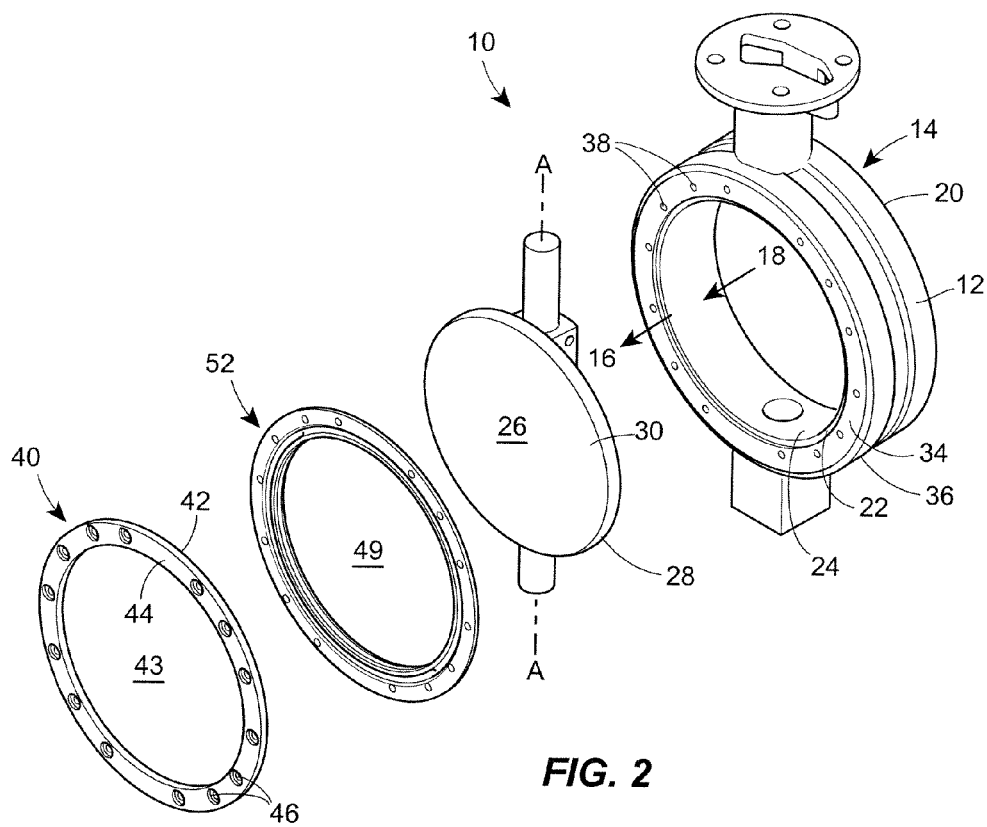
FIG. 2 is an exploded view of a rotary-type control valve such as that in FIG. 1.

Referring now to FIG. 2, which shows an exploded view of the rotary valve 10, a face 34 of an outlet end 36 of the valve body 12 includes a plurality of mounting apertures 38 disposed in a generally circular pattern about the face 34 of the outlet end 36 of the valve body 12. A generally circular retainer ring 40 includes an inner surface 42 and an outer surface 44 and surrounds a central aperture 43 which may be generally aligned with the control passage 18. The retainer ring 40 also includes a plurality of mounting apertures 46, with the mounting apertures 46 disposed in a generally circular pattern about an outer portion of the retainer ring 40. The mounting apertures 46 are positioned to generally align with the mounting apertures 38 on the valve body 12. The mounting apertures 38 and 46 are sized to receive a plurality of fasteners (not shown). Accordingly, by aligning the pattern of apertures 46 with the pattern of apertures 38, the retainer ring 40 can be mounted to the valve body 12 using suitable fasteners.

Figure 3:
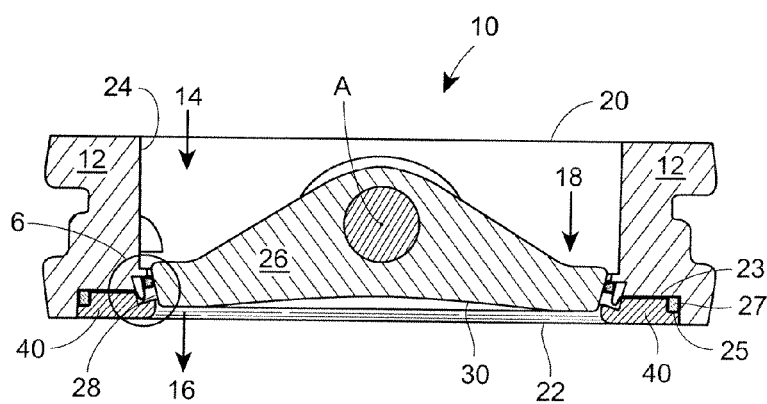
FIG. 3 is an enlarged cross-sectional view taken along line 3-3 of FIG. 1.

A generally circular seal carrier ring 52 includes a central aperture 49 which is sized to be aligned with the aperture 43 in the retainer ring 40 and with the flow passage 18. The carrier ring 52 includes a mounting flange 50 terminating in an outer circumference 51, while an inner circumference 53 surrounds the central aperture 49. The mounting flange 50 includes a pattern of mounting apertures 56, which are sized and positioned to be aligned with the mounting apertures 38 and 46 discussed above. Accordingly, by positioning the seal carrier ring 52 between the retainer ring 40 and the valve body 12, the seal carrier ring 52 can be secured in place between the retainer ring 40 and the valve body 12 using suitable fasteners. The seal carrier ring 52 includes a seal carrier cartridge 58 disposed generally adjacent the inner circumference 53. In the disclosed example, the seal carrier cartridge 58 forms a generally U-shaped channel 74. The seal carrier cartridge 58 will be discussed in greater detail below. Accordingly, when the seal carrier ring 52 is secured in place as shown in FIG. 3, the seal carrier cartridge 58 is positioned to make contact with the sealing surface 28 of the control element 26. It will be understood that the control element 26 may be rotated about its axis A (which extends into the plane of the Figure when viewing FIG. 3), the control passage 18 may be partially or completely opened.

As shown in FIG. 3, the valve body 12 may include a recess 23, with the recess 23 sized to receive the retainer ring 40. Preferably, the recess 23 and the retainer ring 40 are sized and shaped such that the assembly presents a flush face. Further, an outer portion of the retainer ring 40 may include a recess or notch 25, such that a seal 27 may be positioned between the retainer ring 40 and the valve body 12. In the illustration of FIG. 3, it will be noted that the rotating control element 26 of the valve 10 is in the closed position with the sealing surface 28 of the rotating control element 26 in contact with a resilient seal carried by the seal carrier ring 52 as will be described in greater detail below.

Figure 4:
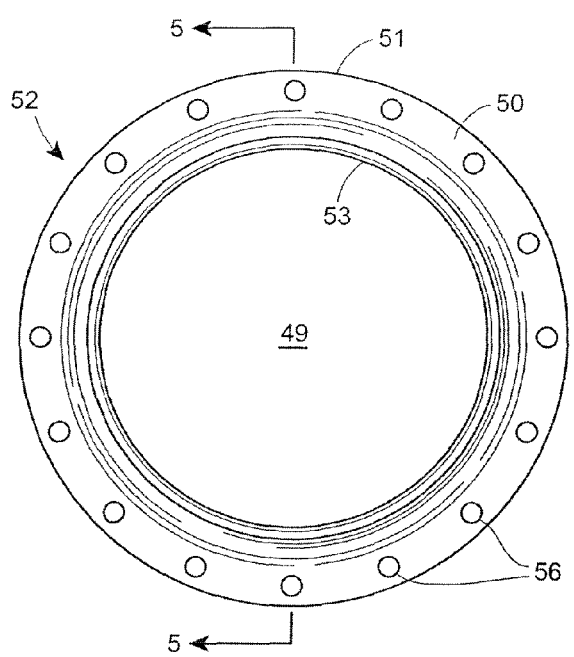
FIG. 4 is a front elevational view illustrating a seal carrier ring having a flexible insert.
Figure 5:
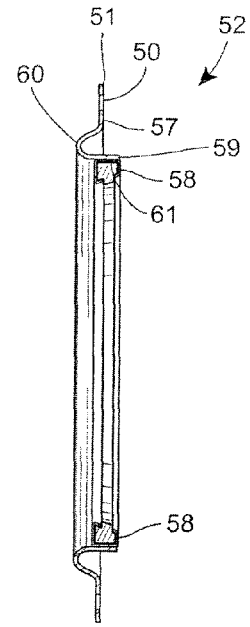
FIG. 5 is a side elevational view of the carrier ring of FIG. 4.

FIGS. 4 and 5 show the seal carrier ring 52 in front and cross-sectional views, respectively. The seal carrier ring 52, having outer circumference 51 and inner circumference 53, includes the annular mounting flange 50 which extends radially outward so as to fit between the valve body 12 and the retainer ring 40. Accordingly, the seal carrier ring 52 may be secured in place by placing the mounting flange 50 between the valve body 12 and the retainer ring 40 and securing the retainer ring 40 with appropriate fasteners.

Figure 6:
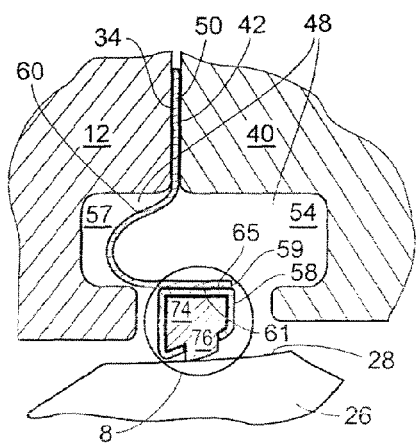
FIG. 6 is an enlarged fragmentary cross-sectional view taken about the circumscribed area of FIG. 3 and showing the carrier ring with a flexible insert disposed between a valve body and a retainer ring.
Figure 7:
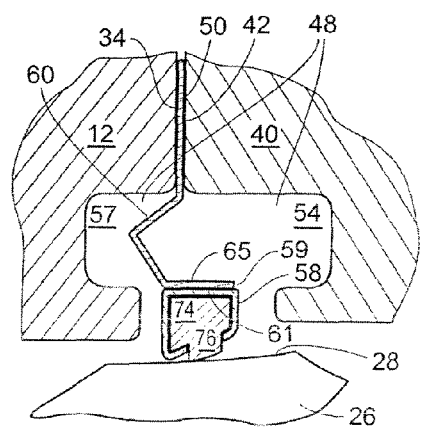
FIG. 7 is an enlarged fragmentary cross-sectional view similar to FIG. 6 and showing an alternative embodiment of the present invention.

The inner portion of the seal carrier ring 52 includes the seal carrier cartridge 58. As best shown in the cross-section of FIGS. 5 and 6, an inner portion of the seal carrier ring 52 forms an annular ring 59 having a surface 61. The seal carrier cartridge 58 is mounted to the surface 61 of the annular ring 59. The annular ring 59 is connected to the mounting flange 50 by a shaped flexible portion 60. In the example of FIGS. 5 and 6, the flexible portion 60 is generally U-shaped or curved and, in accordance with the disclosed example, serves to join the seal carrier cartridge 58 to the mounting flange 50 in such a manner that the seal carrier cartridge 58 may move slightly in a direction parallel to an X-direction, a Y-direction, or may move in some combination of the X and Y directions, or in a manner having components thereof, in response to the application of a load. Although the flexible portion 60 is curved or U-shaped in the disclosed example, other shapes may be chosen, such as, for example, a V-shape (see FIG. 7).

Referring to FIG. 6, the seal carrier cartridge 58 is shown connected to an inner surface of the annular ring 59. In the example of FIG. 6, the flexible portion 60 is curved as outlined above, and preferably the seal carrier ring 52, including the annular mounting flange 50 and the flexible portion 60 are integrally formed from a single piece of material. Those of skill in the art would be familiar with methods of fabricating assembly from two or more distinct pieces to be joined together. The seal carrier cartridge 58 is joined to the inner surface of the annular ring 59. In the embodiment shown in FIG. 6, the annular ring 59 is substantially perpendicular to the mounting flange 50. The flexible portion 60 of the seal carrier ring 52 can be made of any material known to be suitable by those of skill in the art. In the disclosed embodiment, for example, the flexible portion 60 is formed of Inconel 718 or strain-hardened 316 stainless steel.

As is also shown in FIG. 6 an area 48 is formed between the inner surface 42 of the retainer ring 40 and the face 34 of the outlet end 36 of the valve body 12. The area 48 is generally sized to receive the flexible portion 60 of the seal carrier ring 52 and, in the disclosed example, the area 48 provides enough room for the flexible portion 60 to deform slightly in order to allow the seal carrier cartridge 58 to move as discussed above. In the disclosed example, the area 48 is formed by an annular groove 54 formed in the retainer ring 40 and by another groove 57 formed in the valve body 12. Thus, in the disclosed example, the flexible portion 60 of the seal carrier ring 52 is disposed within the groove 54 and/or the groove 57, so as to allow both compressive (generally perpendicular to the sealing surface 28 of the rotating control element 26) and lateral (parallel to the sealing surface 28 of the rotating control element 26) motion of the seal carrier cartridge 58.

As can be seen in FIG. 6, the flexible portion 60 is free to move, bend, or otherwise deflect slightly within the groove 54. The relatively flexible or resilient nature of the flexible portion 60 allows the seal carrier cartridge 58 and resilient seal insert 76 to move relative to the sealing surface 28 of the rotating control element 26. It should be appreciated that the flexible portion 60 of the seal carrier ring 52 may accommodate movement of the rotating control element 52 resulting from pressure and temperature changes while continuing to affect a seal. Additionally, the flexible portion 60 provides a fluid barrier between the inlet 14 and the outlet 16 of the rotary valve 10 when the rotary control element 26 is in the closed position (i.e., when the sealing surface 28 substantially engages the seal carrier ring 52).

Figure 8:
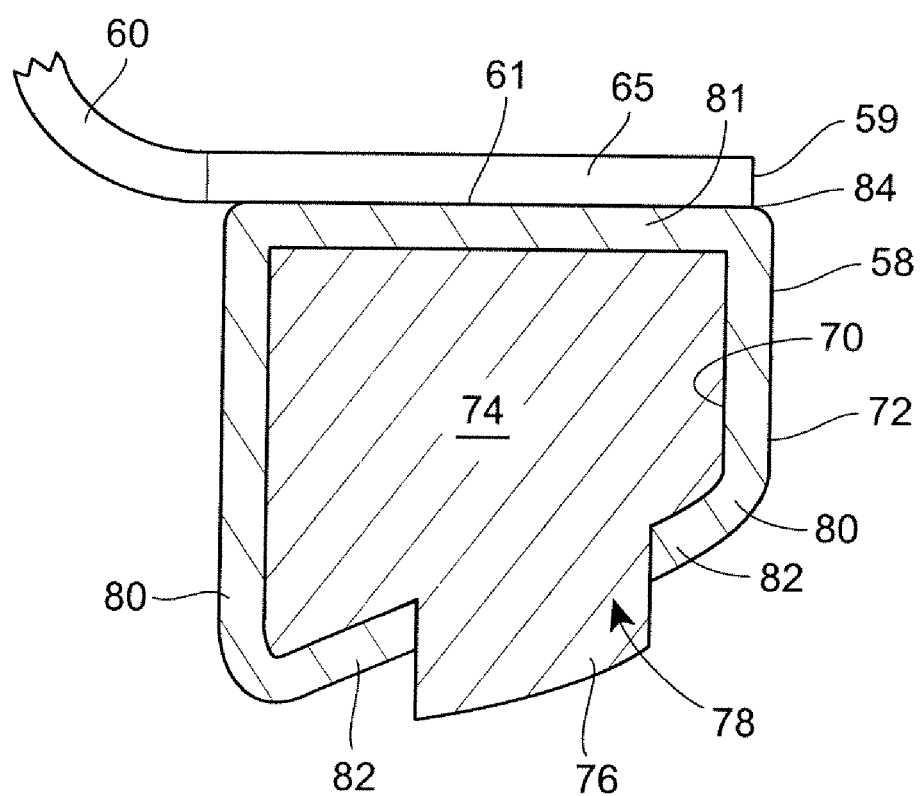
FIG. 8 is an enlarged fragmentary cross-sectional view taken about the circumscribed area of FIG. 6 and showing the seal carrier cartridge and flexible insert.

Referring now to FIG. 8, the seal carrier cartridge 58 has an inner surface 70 and an outer surface 72. The seal carrier cartridge 58 is operably coupled to the cartridge side 65 of the flexible portion 60 along the outer surface 72 of the seal carrier cartridge 58. The inner surface 70 of the seal carrier cartridge 58 defines the carrier channel 74. The carrier channel 74 is sized to receive the resilient seal insert 76, and has an opening 78 bounded by two sides 80 of the seal carrier cartridge 58. A base end 81 is opposite the opening 76 and is secured to the annular ring 59. The seal carrier cartridge 58 may have one or more flanges 82 formed on one or both of the sides 80, which secure the resilient seal insert 76. Alternatively, an adhesive (not shown) could secure the resilient seal insert 76 within the carrier channel 74. The seal carrier cartridge 58 is operably coupled to the flexible portion 60 of the seal carrier ring 52 such that the seal carrier cartridge 58 extends beyond the groove 54 formed by the valve body 12 and the retainer ring 40. In the disclosed example, illustrated by FIG. 8 (and by FIG. 6), a laser weld 84 between the surface 61 of the annular ring 59 and the outer surface 72 of the seal carrier cartridge 58 operably couples the flexible portion 60 to the seal carrier cartridge 58, along the base end 81 of the seal carrier cartridge 58. However, the seal carrier cartridge 58 could also be operably coupled to the flexible portion 60 along one of the sides 80 of the seal carrier cartridge 58. Likewise, the means of attaching the seal carrier cartridge 58 to the flexible portion 60 could be any method generally known to those of skill in the art. The seal insert 76 is sized to fit within the carrier channel 74 and is retained by the flange or flanges 82 on the seal carrier cartridge 58.

The resilient seal insert 76 is also sized for sealing engagement with the sealing surface 28 of the rotating control element 26. In the disclosed example, the resilient seal insert 76 can be formed from known materials such as Polytetrafluoroethylene (PTFE), reinforced PTFE, graphite, reinforced graphite, Ultra-High Molecular Weight Polyethylene (UHMWPE), or Chlorotrifluoroethylene resin (CTFE or KEL-F). However, other materials, recognized by those in the art as being suitable for particular applications, depending on temperature, pressure, and other characteristics, could also be used.

Thus, it should be appreciated that, in accordance with the disclosed example, in operation the resilient seal 74 retained within the seal cartridge carrier 58 may provide a tight shutoff generally associated with conventional soft seat valves while also providing the ruggedness or resistance to degradation or erosion of a metal seal. Additional, as the resilient seal 74 wears away in abrasive or corrosive applications, or is consumed due to high temperature applications, the seal carrier cartridge 58 may function as a secondary seal providing substantial flow restriction until appropriate maintenance, repair, or replacement steps may be taken.

The above-described details in the various figures need not be mutually exclusive. That is, in accordance with the spirit and scope of the preferred examples disclosed herein, one may pick and choose various aspects of the several figures and combine those selected aspects with other selected aspects illustrated and described with respect to different figures.

Numerous modifications and alternative embodiments of the invention will be apparent to those skilled in the art in view of the foregoing descriptions. Accordingly, these descriptions are to be construed as illustrative only and are for the purpose of teaching those skilled in the art the best mode or modes presently contemplated for carrying out the invention. The details of the structure or structures disclosed herein may be varied substantially without departing from the spirit of the invention, and the exclusive use of all modifications which come within the scope of the appended claims, either literally or under the doctrine of equivalents, is reserved.

What is claimed:

1. A rotary valve comprising:
    a valve body having an inlet, an outlet, a flow passage extending between the inlet and the outlet, and a first surface;
    a rotating control element disposed within the valve body for selectively opening and closing the flow passage;
    a retainer ring mounted to the valve body, and having a second surface generally facing the first surface; and
    a seal carrier ring having an annular mounting flange mounted between the valve body and the retainer ring, the mounting flange having two sides and engaged on one side by the first surface and on the other side by the second surface, the seal carrier ring including a seal carrier cartridge having a cartridge attachment face on an exterior surface of the seal carrier cartridge, the cartridge attachment face abutting a corresponding attachment surface on a curvilinear flexible portion, the curvilinear flexible portion extending from the corresponding attachment surface to the mounting flange;
    wherein a first groove surface in the retainer ring and a second groove surface in the valve body cooperate to define an area sized to receive the flexible portion, and wherein the area is sized so that the seal carrier cartridge resides approximately at a midpoint between the valve body and the retainer ring.

2. The rotary valve of claim 1 wherein the flexible portion is disposed within the annular groove.

3. The rotary valve of claim 1 wherein the seal carrier cartridge includes a resilient seal insert sized for sealing engagement with a sealing surface of the rotating control element.

4. The rotary valve of claim 3 wherein the resilient seal insert is formed from a material selected from the group consisting of PTFE, reinforced PTFE, graphite, reinforced graphite, UHMWPE, or KEL-F.

5. The rotary valve of claim 1 wherein the seal carrier cartridge includes a resilient seal insert disposed in a carrier channel.

6. The rotary valve of claim 5 wherein the resilient seal insert is secured within the carrier channel by a crimped sidewall on the channel.

7. The rotary valve of claim 5 wherein the carrier channel includes a U-shaped cross-section having at least one retaining flange.

8. The rotary valve of claim 7 wherein the retaining flange is formed by a crimped sidewall on the channel.

9. The rotary valve of claim 5 wherein the resilient seal insert is secured within the carrier channel by an adhesive.

10. The rotary valve of claim 5 wherein the resilient seal insert is secured within the carrier channel by a retaining flange and an adhesive.

11. The rotary valve of claim 1 wherein the flexible portion is strain-hardened 316 stainless steel.

12. The rotary valve of claim 1 wherein the flexible portion is formed of an alloy comprising nickel-chromium.

13. The rotary valve of claim 1 wherein the seal carrier cartridge is operably coupled to the flexible portion by a laser weld.

14. The rotary valve of claim 1 wherein the mounting flange and the flexible portion are integrally formed from a single piece of material.

15. A seal for use in a butterfly valve having a valve body and a retainer ring, the seal comprising:

a seal carrier ring having an annular mounting flange sized to extend between a first mounting surface on the valve body and a second mounting surface on the retainer ring;

a seal carrier cartridge formed separately from the seal carrier ring, the seal carrier cartridge coupled to the seal carrier ring along an attachment surface; and a flexible portion having a cartridge side and a flange side and coupling the seal carrier cartridge to the mounting flange;

wherein the flexible portion is exclusively curvilinear between the attachment surface on the cartridge side and the flange; and wherein the flexible portion is sized to be disposed at least partially in an area defined by a first groove surface in the retainer ring and a second groove surface in the valve body.

16. The seal of claim 15 wherein the seal carrier cartridge includes a resilient seal insert sized for sealing engagement with a sealing surface of a rotating control element.

17. The seal of claim 16 wherein the resilient seal insert is formed from a material selected from the group consisting of PTFE, reinforced PTFE, graphite, reinforced graphite, UHM-WPE, or KEL-F.

18. The seal of claim 15 wherein the seal carrier cartridge includes a resilient seal insert disposed in a carrier channel.

19. The seal of claim 18 wherein the resilient seal insert is secured within the carrier channel by a crimped sidewall on the channel.

20. The seal of claim 15 wherein the retaining flange is formed by a crimped sidewall on the channel.

21. The seal of claim 18 wherein the resilient seal insert is secured within the carrier channel by an adhesive.

22. The seal of claim 18 wherein the resilient seal insert is secured within the carrier channel by a retaining flange and an adhesive.

23. The seal of claim 15 wherein the flexible portion is strain-hardened 316 stainless steel.

24. The seal of claim 15 wherein the flexible portion is formed of an alloy comprising nickel-chromium.

25. The seal of claim 15 wherein the seal carrier cartridge is operably coupled to the flexible portion by a laser weld.

26. The seal of claim 15 wherein the mounting flange and the flexible portion are integrally formed from a single piece of material.

27. A flexible seal carrier for use in a butterfly valve having a valve body having a first mounting surface and a first groove formed by a first groove surface, a retainer ring having a second mounting surface and a second groove formed by a second groove surface, and a valve disk having a sealing surface, the first groove and the second groove forming an annular groove, the flexible seal carrier comprising:

a radially outward extending mounting portion sized to extend between the first mounting surface and the second mounting surface;

a sealing member sized to surround the sealing surface of the valve disk to form a sealing engagement;

a curvilinear, shaped cross-section extending between the mounting portion and the sealing member and arranged to fit at least partially within the annular groove and to permit the sealing member to shift within the annular groove relative to an axis perpendicular to the sealing surface of the valve disk and an axis parallel to the sealing surface of the valve disk; and a separately-formed seal carrier cartridge coupled to an attachment face of the shaped cross-section at a cartridge side of the shaped cross-section and sized to retain the sealing member.

28. The flexible seal carrier of claim 27 wherein the shaped cross-section creates a resilient geometry.

29. The flexible seal carrier of claim 27 wherein the shaped cross-section is strain-hardened 316 stainless steel.

30. The flexible seal carrier of claim 27 wherein the shaped cross-section is formed of an alloy comprising nickel-chromium.

31. The flexible seal carrier of claim 27 wherein the portion or portions extending radially outward and the shaped cross-section are integrally formed from a single piece of material.

32. A rotary valve comprising:

a valve body having an inlet, an outlet, a flow passage extending between the inlet and the outlet, and a first surface;

a rotating control element having a sealing surface and disposed within the valve body for selectively opening and closing the flow passage;

a retainer ring mountable to the valve body, and having a second surface generally facing the first surface;

an annular channel defined by the cooperation of a first groove surface in the valve body and a second groove surface in the retainer ring; and a seal carrier ring comprising:
  a radially outward extending mounting portion sized to extend between the first surface on the valve body and the second surface on the retainer ring;
  a sealing member sized to surround the sealing surface of the control element to form a sealing engagement;
  a curvilinear shaped cross-section disposed between the mounting portion and the sealing member and arranged to fit at least partially within the annular channel and to permit the sealing member to shift within the annular channel relative to an axis perpendicular to the sealing surface of the control element and an axis parallel to the sealing surface of the control element; and
  a seal casing retaining the sealing member and affixed along an attachment face to the shaped cross-section, wherein a plane defined by the attachment face is orthogonal to a plane defined by the mounting portion.

33. The rotary valve of claim 32, wherein:

the sealing member is movable in a first direction parallel to the sealing surface of the control element upon application of a first load, and the sealing member is movable in a second direction opposite to the first direction and parallel to the sealing surface of the control element upon application of a second load.

34. A rotary valve comprising:

a valve body having an inlet, an outlet, a flow passage extending between the inlet and the outlet, and a first surface;

a valve disk disposed within the valve body for selectively opening and closing the flow passage;

a retainer ring mounted to the valve body and having a second surface generally facing the first surface;

a seal carrier ring having an annular mounting flange mounted between the valve body and the retainer ring; and a seal carrier cartridge coupled to the annular mounting flange by a curvilinear flexible portion, the curvilinear flexible portion coupled to the seal carrier cartridge along an attachment face of the seal carrier cartridge.

* * * * *